Patented Oct. 10, 1944

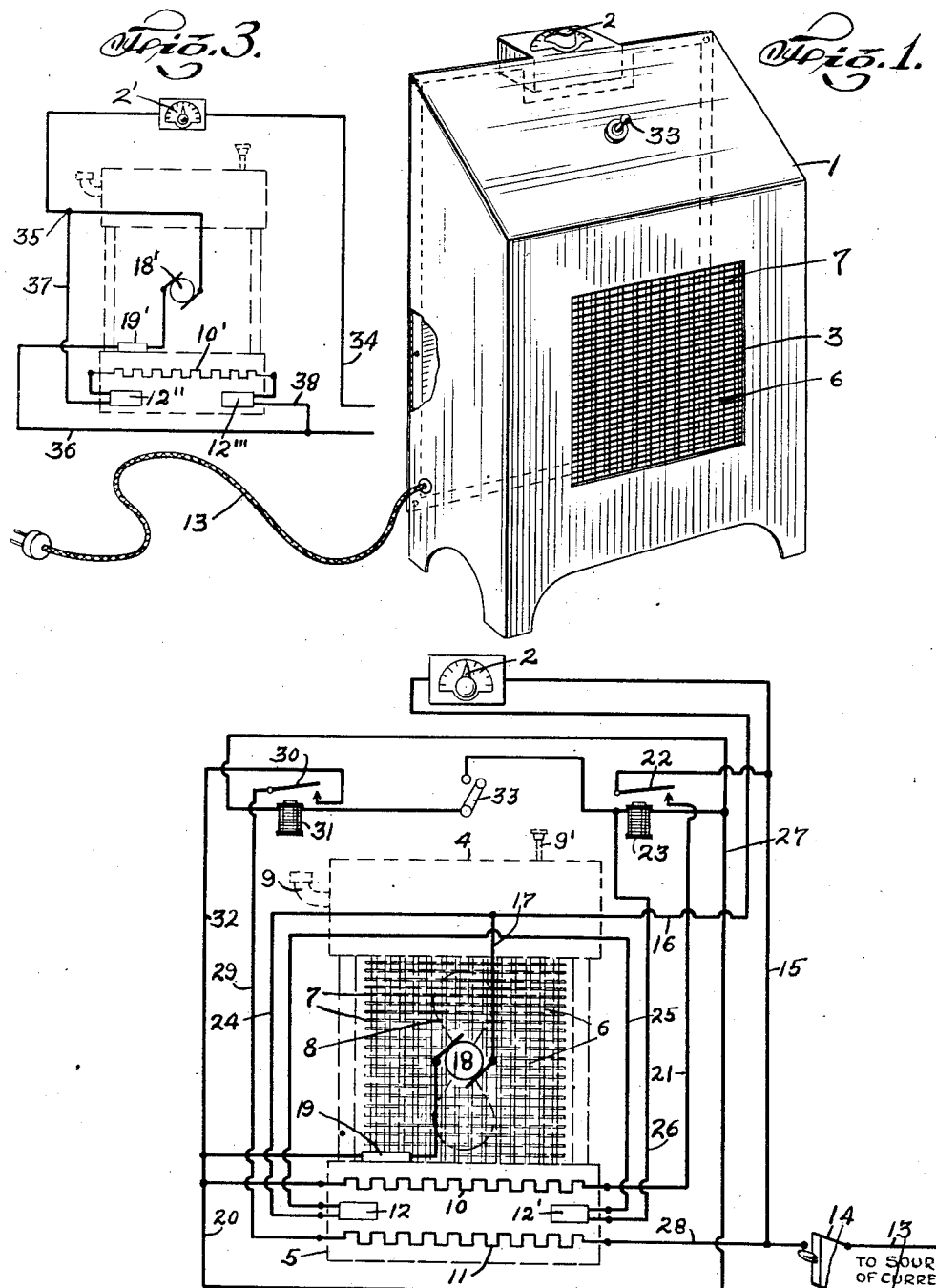

2,360,071

UNITED STATES PATENT OFFICE 2,360,071

ELECTROLIQUID APARTMENT HEATER

Theobald H. Noll, Bellaire, N. Y.

Application November 14, 1941, Serial No. 419,076

7 Claims. (Cl. 219—39)

This invention relates to means for heating apartments or compartments by electricity.

It has especial reference to the even, accurate and reliable heating by electricity of apartments within which are contained bomb sights or other compartments requiring heating of the characteristics mentioned.

Apartments have been heated by liquid or vapors but the apparatus therefor is cumbersome in construction, usually fixed in position and awkward to control, not to mention the complication of apparatus for effecting the control, especially automatic control. Electricity provides a means of heating which is readily controllable without complication and permits the heater to be flexible in its location, that is it is readily moved or adjusted from one position to another. Heat as produced by an electric resistor, however, is concentrated to a comparatively small location, so that when applied to the heating of an apartment the heat is much more intense at some places in the apartment than at others. This even is true where a fan blows the atmosphere of the apartment across the heated resistors.

According to the present invention the electrically generated heat is caused to be dispersed over a large area by heating a liquid in a container having openings through which air is caused to flow, and, being heated by contact with the container, carries the heat to the various portions of the compartment. The dispersion of the heat of the electric resistor throughout the liquid of the container produces a large heated contact area for the circulating air whereby a larger volume of the air is heated, the heat is more thoroughly and widely dispersed throughout the air instead of being concentrated in relatively small locations, and the transfer of heat to the air is more efficient, so that the heat generated by the electricity is more efficiently utilized and is more thoroughly and uniformly distributed through the apartment.

It is desirable in many applications that the temperature of the apartment shall be maintained substantially uniform, or within upper and lower limits, not becoming too hot or too cold. It is a further object of the invention to provide means for regulating the heating to accomplish such results.

A further object of the invention is to provide means for shutting off the electric heating means when the liquid in the container shall have its contained liquid reduced below a certain amount as by leakage or other reason for depletion.

Other and ancillary objects of the invention will appear hereinafter.

In the accompanying drawing which illustrates the invention—

Fig. 1 is a perspective view of heating apparatus embodying the invention;

Fig. 2 is a diagrammatic view of the apparatus with a wiring diagram of the electrical apparatus and connections of the apparatus of Fig. 1; and Fig. 3 is a diagrammatic view of apparatus with a wiring diagram of the electric apparatus and connections of a modified form of the invention.

Referring to the drawing and first to Figs. 1 and 2, the apparatus comprises a suitable housing 1 upon which is mounted the thermostat 2 adapted to be set for operation at various temperatures, said thermostat being exposed to the temperature of the room or apartment to be heated, in which the apparatus is placed. By setting this thermostat to be operated at the desired temperature, the temperature of the room will be automatically and evenly maintained at that value. Such adjustable thermostats are well known and require no further description.

The housing 1 has a window 3 through which the heated air is blown into the apartment. Within the casing and directly back of the window is the liquid container, comprising upper and lower liquid containing heads 4 and 5 between which extend a plurality of tubes providing liquid conducting channels therebetween. The heads and tubes of the container are preferably of metal to facilitate the transfer of heat from the heated liquid to the outside air, and this may be facilitated by metal strips 7 through which the tubes are threaded, the strips contacting with the tubes and forming in effect heat radiating fins thereon.

Within the housing 1 and back of the liquid container is an electric fan 8 which serves to blow air between the tubes 6 outwardly through the window 3, and the air thus blown, being heated in passing through the container carries the heat outwardly into the room and distributes it.

The upper container head 4 is provided with a filling intake 9 through which sutable liquid may be supplied to the container, a suitable check valve opening inwardly, but not outwardly, being provided to permit ingress of the liquid to the container but preventing egress therefrom.

Also the upper head of the liquid container is provided with any suitable or well-known construction of safety valve 9' to relieve against undue pressure in the container by expansion from heating up the liquid or the formation of steam.

In the liquid in the lower head 5 of the container are immersed the electric heating resistors 10 and 11. Such resistors are, in a manner well understood, insulated from the water. Also interposed in the liquid in the lower head 5 is the thermostat 12 of well known or suitable construction adapted to open the circuit at a certain limit of maximum temperature of the water.

Also in the lower head 5 is the aquastat 12' exposed to the liquid in the lower head and adapted to open the circuit upon accidental leaking out, or other manner of depletion, of the liquid and to close the circuit when there is sufficient liquid in the container. This aquastat 12' may be operated by the pressure of the water in the container and may be of a well known and suitable construction. If it is not thought necessary or desirable for the aquastat to be provided for the purpose stated, it may be omitted, the circuit being completed by connecting the conductors 25 and 26 together directly instead of through the aquastat.

The connecting wires 13 may be connected with the heating apparatus by means of a double-pole switch 14 by which the apparatus may be connected with, or entirely disconnected from, the source of current at will. When the switch is closed one side of the conducting circuit is connected through a conductor 15 through the adjustable thermostat 2 and the conductor 16 with a conductor 17 connected with one side of the fan motor 18, the other side of the fan motor being connected through a thermostat 19 with the conductor 20 leading to the other side of the main switch. The thermostat 19 is of any suitable or well known construction adapted to close the circuit when the temperature is above a pre-determined minimum. This thermostat being mounted upon the metal lower head 5 it will close upon a certain minimum temperature of the container at that point which is dependent upon and substantially that of, the liquid within the head.

The circuit of the heating resistor 10 may be traced from the conductor 20 connected to one side of the source of supply, through the resistor, the conductor 21 and the armature 22 of the electro-magnet 23, to the conductor 15 connected with the other side of the source. In order therefore to close the circuit of the resistor 10, it is necessary to energize the electro-magnet 23. The circuit of this electro-magnet is made through the conductor 15 connected with one side of the source of supply through the adjustable thermostat 2, conductor 16, conductor 24, thermostat 12, conductor 25, aquastat 12', conductor 26 and electro-magnet 23 to conductor 27 which is connected with the other side of the source of supply.

The container having been filled with water or other suitable liquid, for instance an anti-freeze compound, the switch 14 is closed when the circuit of the fan motor will be closed except for the thermostat 19. Also the circuit of the magnet 23 will be closed thereby closing the circuit at its armature 22 whereupon the circuit of the resistor 10 will be closed in series with the thermostat 12 and the aquastat 12'. The resistor having its circuit thus closed will heat the water in the lower head 5. When the water arrives at a certain temperature the thermostat 19 will be closed whereupon the fan will be set in operation. If the liquid in the container should be depleted unduly by leakage or otherwise, the aquastat 12' will open the circuit of the electro-magnet 23 thereby breaking the circuit of the resistor 10 so that the supply of heating current will be cut off.

Also if the temperature of the water in the container located in the lower head becomes greater than a maximum, the circuit will be opened at the thermostat 12 to cut off the heating current from the resistor. Should the temperature of the room be above that for which the adjustable thermostat 2 is set, that thermostat will open the circuit of the resistor and also the fan so that the heating operation will be suspended until the temperature of the room or apartment has fallen to that for which the thermostat 2 is set when the thermostat will again close the circuit and the apparatus be again set in operation. In this manner the temperature of the room or apartment is rendered suitably uniform.

The electro-magnet 23 is employed with its armature 22 to break the circuit of the resistor, such electro-magnet being in turn controlled by the thermostat and the aquastat, in order to avoid the necessity of breaking the relatively large current required by the resistor upon the thermostat or aquastat contacts. With the arrangement employed such circuit is broken at the armature 22. It will only be necessary to break the relatively small energizing current of the electro-magnet at the thermostat or aquastat.

It will now appear that the container having been suitably filled with water or other appropriate liquid, and the main switch 14 closed, the circuit of the resistor 10 will be closed whereupon the water in the container will be heated, circulating through the heads and other connecting tubes. When the water in the container has been heated to a desired minimum degree, the circuit of the fan motor 18 will be closed at the thermostat 19 when the fan will be set in operation. The water being thus heated, will circulate, distributing the heat throughout the container and the fan blowing the air through the openings in the container will still further distribute and disperse the heat throughout the room or apartment to be heated so that there will be a thorough distribution throughout the room without unduly concentrating the heat at one point while leaving it relatively unheated at another location. If the heat of the liquid in the container should become too great, the thermostat 12 will open the circuit of the resistor, thus removing the heating source. When the liquid has cooled down sufficiently, the circuit will be closed at the thermostat thereby placing the heating resistor again in operation. The ultimate function, namely the heating of the air in the room or apartment, is regulated by the thermostat 2 which is adjusted to the desired temperature. When this temperature is exceeded the apparatus is disconnected from one side of the source of supply thereby disconnecting the entire apparatus and causing the cessation of the heating until the temperature shall reach or be slightly below that for which the thermostat 2 is set.

It may be that one resistor 10 may not be sufficient to produce the desired heating. It, therefore, may be desirable to provide one or more supplementary resistors, as the resistor 11, to increase the heating effect, or a plurality of resistors might be desired for purposes of regulation or for other reasons. In the structure shown there is, in addition to the resistor 10, a similar resistor 11 in the lower head 5, which resistor is connected with one side of the source of supply by the conductor 28, the other end of the resistor 11 being connected through the conductor 29 with the armature 30 of the electro-magnet 31, and the conductor 32 with the other side of the source of supply. The circuit of the electro-magnet 31 is connected in parallel with the electro-magnet 23 by means of the switch 33. By means of this switch the electro-magnet 31 and therefore the resistor 11 may be placed in operation by closing the circuit 33, while the resistor 11 may be removed from operation by opening the switch 33.

It will be seen that when the resistor 11 is thrown into operation by closing the switch 33, such resistor will be subject to the control of the thermostat 12 and the aquastat 12' in the same manner as pointed out in connection with the resistor 10.

Referring now to the apparatus as shown in Fig. 3, such modified apparatus may be employed where one heating resistor is sufficient and also where the resistor current may be safely broken directly upon the contacts of the controlling aquastat and thermostat. Thus in Fig. 3 the conductor 34 from one side of the source of supply connects through the adjustable thermostat 2' with the junction 35 of the fan motor circuit and the heating resistor circuit. From the junction 35 circuit passes through the fan motor 18' and the thermostat 19', corresponding to the thermostat 19 of Fig. 2, to the conductor 36 connected with the other side of the source of supply. From the junction 35 circuit passes through the conductor 37, the thermostat 12" corresponding to the thermostat 12 of Fig. 2, through the heating resistor 10' and the aquastat 12''' corresponding to the aquastat 12' of Fig. 2, and thence through a conductor 38 to the other side of the source of supply.

It will be seen by this arrangement that the whole apparatus will be put into and out of operation in accordance with the thermostat 2' controlled by the room temperature and that the operation of the fan is controlled by the thermostat 19' which is responsive to the temperature of the container, which is dependent upon that of its contained liquid, closing the circuit at or above a minimum temperature. It will further be seen that the heating resistor 10' is directly controlled by the thermostat 12" and the aquastat 12'''. This is a simpler apparatus and may prove adequate for many applications.

While the invention has been illustrated, in what are considered its best applications, it may have other embodiments without departing from its spirit and is not, therefore, limited to the structures shown in the drawing.

What I claim is:

1. In an electro-liquid apartment heater, the combination with a liquid container comprising upper and lower heads and tubes extending between said heads and affording passages for liquid between said heads, of an electric heating resistor in the said lower head of said container, an electric circuit for said resistor, a fan adapted to force air between said tubes, a thermostat and an aquastat both within said lower head and connected in series in said circuit.

2. In an electro-liquid apartment heater, the combination with a liquid container having openings therethrough, of an electric heating resistor adapted to heat liquid in said container, an electrically operated fan having an operating electric circuit connected with the supply mains in shunt with the said resistor whereby the fan receives substantially the full voltage of said mains, for forcing air through said openings and means for controlling the said operating circuit of said fan according to the temperature of said liquid.

3. In an electro-liquid apartment heater, the combination with a liquid container comprising upper and lower heads, and tubes extending between said heads and providing conducting liquid channels therebetween, of an electrically operated fan adapted to blow air between said tubes, an electric heating resistor in said lower head, means for controlling said electric fan and resistor according to the temperature of the apartment to be heated, the temperature of the liquid in said lower head and the amount of liquid in said container, and additional thermostatic means controlled by the temperature of said lower head to render the fan inoperative when the temperature of said lower head is below a predetermined value.

4. In an electro-liquid apartment heater, the combination with a liquid container comprising upper and lower heads and liquid-conducting channels connecting said heads whereby liquid may flow therebetween, there being openings between said channels for the passage of air, means for forcing air through said openings, electric supply mains, and a plurality of heating resistors in the said lower head adapted to be connected in parallel relation between said supply mains, a switch for controlling the circuit of one of said resistors and a circuit connection common to said resistors and controlling the connection of said resistors with the supply line, said circuit connection comprising a thermostat and an aquastat located in said lower head and connected in series.

5. In an electro-liquid apartment heater, the combination with a liquid container comprising upper and lower heads, liquid-conducting channels connecting said heads whereby liquid may flow therebetween, there being openings between said channels for the passage of air, of an electric-heating resistor in the said lower head, an electrically-operated fan for forcing air through said openings, a circuit for said fan and a thermostat in said fan circuit, said thermostat being mounted upon the outside of and in good heat-conducting relation with the said lower head and means for supplying electrical energy to said resistor including a thermostat in the apartment to be heated.

6. In an electro-liquid apartment heater, the combination with a liquid container comprising upper and lower heads and liquid-conducting channels connecting said heads whereby liquid may flow therebetween, there being openings between said channels for the passage of air, of an electric heating resistor in said lower head adapted to heat said liquid, an electrically-operated fan having an operating electric circuit, for forcing air through said openings and means in direct heat-conducting relation with said lower head for controlling the said operating circuit of said fan according to the temperature of the liquid in said lower head and means for supplying electrical energy to said resistor including a thermostat in the apartment to be heated.

7. In an electro-liquid apartment heater, the combination with a liquid container comprising upper and lower heads, and tubes extending between said heads and providing conducting liquid channels therebetween, of an electrically operated fan adapted to blow air between said tubes, and electric heating resistor in said lower head, means for controlling said electric fan and resistor according to the temperature of the apartment to be heated and the temperature of the liquid in said lower head, and an additional thermostatic means controlled by the temperature of said lower head to render the fan inoperative when the temperature of said lower head is below a predetermined value.

THEOBALD H. NOLL.